United States Patent
Duckworth et al.

(10) Patent No.: US 10,521,681 B1
(45) Date of Patent: Dec. 31, 2019

(54) METHOD FOR DETERMINING CORRECT SCANNING DISTANCE USING AUGMENTED REALITY AND MACHINE LEARNING MODELS

(71) Applicant: Capital One Services, LLC, McLean, VA (US)

(72) Inventors: Staevan Duckworth, The Colony, TX (US); Daniel Martinez, Plano, TX (US); William Hardin, Dallas, TX (US); Jonathan Castaneda, Plano, TX (US); Susie Lee, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/456,108

(22) Filed: Jun. 28, 2019

Related U.S. Application Data

(62) Division of application No. 16/168,633, filed on Oct. 23, 2018, now Pat. No. 10,380,440.

(51) Int. Cl.
| | | |
|---|---|---|
| *G06K 9/00* | (2006.01) |
| *G06F 16/9535* | (2019.01) |
| *G06T 7/73* | (2017.01) |
| *G01B 11/03* | (2006.01) |
| *G06N 20/00* | (2019.01) |
| *G06F 17/18* | (2006.01) |
| *G01B 11/02* | (2006.01) |
| *G06T 19/00* | (2011.01) |

(52) U.S. Cl.
CPC ........ *G06K 9/00825* (2013.01); *G01B 11/026* (2013.01); *G01B 11/03* (2013.01); *G06F 16/9535* (2019.01); *G06F 17/18* (2013.01); *G06N 20/00* (2019.01); *G06T 7/73* (2017.01); *G06T 19/006* (2013.01); *G06T 2207/20081* (2013.01); *G06T 2207/30252* (2013.01)

(58) Field of Classification Search
CPC .. G06K 9/00825; G06K 9/00671; G06K 9/46; G06T 7/62; G06T 7/70–75; G06T 19/006; G06T 2207/10028; G06T 2207/30244; G06T 2207/30204; G06N 20/00; G06F 16/9535; G06F 17/18; G06F 3/0304; G06F 3/0346; G01B 11/002; G01B 11/02; G01B 11/026; G01B 11/03; G01S 17/06008
See application file for complete search history.

(56) References Cited

U.S. PATENT DOCUMENTS

| | | |
|---|---|---|
| 7,222,021 B2 | 5/2007 | Ootomo et al. |
| 8,896,686 B2 | 11/2014 | Chen et al. |

(Continued)

*Primary Examiner* — Michael S Osinski
(74) *Attorney, Agent, or Firm* — Hunton Andrews Kurth LLP

(57) ABSTRACT

A smart device is provided with an application program for displaying a video feed received from the smart device's camera. The application can determine the coordinates for an intersection point, which is a point on the ground where the smart device is pointing at. The application can display a target on the visual representation of the intersection point. Based on whether the smart device is at an appropriate distance from the intersection point, the user interface can superimpose an indicator on the video feed received from the camera. This can inform the user whether the smart device is at an optimal scan distance from the intersection point (or an object) so that the object can be identified by a machine learning model.

7 Claims, 6 Drawing Sheets

(56) References Cited

U.S. PATENT DOCUMENTS

| | | |
|---|---|---|
| 9,024,972 B1 | 5/2015 | Bronder et al. |
| 9,280,824 B2 | 3/2016 | Fukuda |
| 9,373,169 B2 | 6/2016 | Varekamp et al. |
| 9,466,119 B2 | 10/2016 | Bae et al. |
| 9,470,792 B2 | 10/2016 | Giger |
| 9,971,942 B2 | 5/2018 | Fan et al. |
| 10,002,442 B1 | 6/2018 | Dagley et al. |
| 10,026,209 B1 | 7/2018 | Dagley et al. |
| 10,078,921 B1 | 9/2018 | Dagley et al. |
| 10,274,316 B2 | 4/2019 | Siercks et al. |
| 2005/0174429 A1 | 8/2005 | Yanai |
| 2005/0243329 A1 | 11/2005 | Ohtomo et al. |
| 2010/0091110 A1 | 4/2010 | Hildreth |
| 2011/0109628 A1 | 5/2011 | Rurin |
| 2012/0210255 A1 | 8/2012 | Ooi et al. |
| 2012/0314030 A1 | 12/2012 | Datta et al. |
| 2013/0002861 A1 | 1/2013 | Mitsugi |
| 2013/0314688 A1 | 11/2013 | Likholyot |
| 2014/0037138 A1 | 2/2014 | Sato et al. |
| 2015/0022659 A1 | 1/2015 | Yamada et al. |
| 2015/0049185 A1 | 2/2015 | Bae et al. |
| 2015/0062112 A1 | 3/2015 | Reisner-Kollman et al. |
| 2015/0091903 A1 | 4/2015 | Costello et al. |
| 2015/0097865 A1 | 4/2015 | Subramanian et al. |
| 2015/0130790 A1 | 5/2015 | Vasquez, II et al. |
| 2015/0161822 A1 | 6/2015 | Basu |
| 2015/0185825 A1 | 7/2015 | Mullins |
| 2016/0005229 A1 | 1/2016 | Lee et al. |
| 2016/0125588 A1 | 5/2016 | Choi et al. |
| 2016/0189426 A1 | 6/2016 | Thomas et al. |
| 2016/0246302 A1 | 8/2016 | Liao et al. |
| 2016/0292533 A1 | 10/2016 | Uchiyama et al. |
| 2017/0001563 A1 | 1/2017 | Fukushima |
| 2017/0091945 A1 | 3/2017 | Vetterli et al. |
| 2017/0109897 A1 | 4/2017 | Oguro et al. |
| 2017/0191826 A1 | 7/2017 | Nagori et al. |
| 2018/0052839 A1 | 2/2018 | Sharma et al. |
| 2018/0061075 A1 | 3/2018 | Kawano |
| 2018/0120793 A1 | 5/2018 | Tiwari |
| 2018/0157035 A1 | 6/2018 | Fujita |
| 2018/0253823 A1 | 9/2018 | Furuki et al. |

METHOD FOR DETERMINING CORRECT SCANNING DISTANCE USING AUGMENTED REALITY AND MACHINE LEARNING MODELS

CROSS REFERENCE TO RELATED APPLICATION

The subject application is a Divisional of Ser. No. 16/168,633 filed Oct. 23, 2018, the contents of which is hereby incorporated by reference in its entirety.

BACKGROUND

Augmented reality is an enhanced version of reality where live direct or indirect views of physical real-world environments are augmented with superimposed computer-generated images over a user's view of the real-world. Sometimes, augmented reality includes computer-generated perceptual information across multiple sensory modalities, including visual, auditory, haptic, somatosensory, and olfactory. Augmented reality can enhance one's current perception of reality.

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

Augmented reality can be used to superimpose virtual objects (or augmented reality objects) on a display of an image of an environment that is being captured (e.g., in real time). For example, a user of a smart device (e.g., a smartphone, a tablet, smart glasses, a wearable device, or the like) can use a camera of the smart device to capture video of the user's surroundings, and the smart device (e.g., an augmented reality application running on the smart device) may superimpose a representation of an object (e.g., an augmented reality object) on the image being captured by the smart device. In order to place the augmented reality object on the display, the smart device may need to correctly determine a location of the ground of the environment.

In an example embodiment of the present disclosure, a smart device is provided with an application program ("application"). The application can display a graphical user interface capable of displaying video or photo signals received from the smart device's camera. In particular, the user interface can display live video feed received from the camera. The application can determine the location of the ground of the environment. The application can also determine the coordinates for an intersection point, which is a point on the ground where the smart device is pointing at. The user interface can display a target on the visual representation of the intersection point.

The application can calculate a distance between the smart device and the intersection point and the user interface can present an indicator of the distance to the user. The application can also determine a threshold range of distances considered to be acceptable from the intersection point. Based on whether the distance from the intersection point is within the acceptable threshold range, the user interface can superimpose the indicator on the live video feed to create an augmented reality interface for the user. This can inform the user whether the user is at an appropriate distance (i.e., optimal scan distance) from an object so that the object can be identified by a machine learning model. The user interface is also capable of taking photographs of the incoming videos or photos. The photographs can be taken automatically, or it can be taken at the instruction of the user.

The threshold distance range can be a preset number or it can be a number that can dynamically change based on various factors.

Once the user of the application takes a photo of the object (or the application takes a photo automatically), the application can feed the photo into a model. The model can be a machine learning model trained to identify a specific type or brand of objects, e.g., make, model or year of a car. The application can crop the photo when providing the photo to the model.

If the model identifies the object depicted in the photo, the user interface of the application can display the identity of the object, e.g., year, make and model of the car, to the user. Otherwise, the application can display an error message. The application can also use this information to conduct a search. For example, the application can conduct an online inventory search for the specific year, make and model of the vehicle identified by the model. The application can also display the search results and various information relating to the search results.

DETAILED DESCRIPTION

Figure 1:
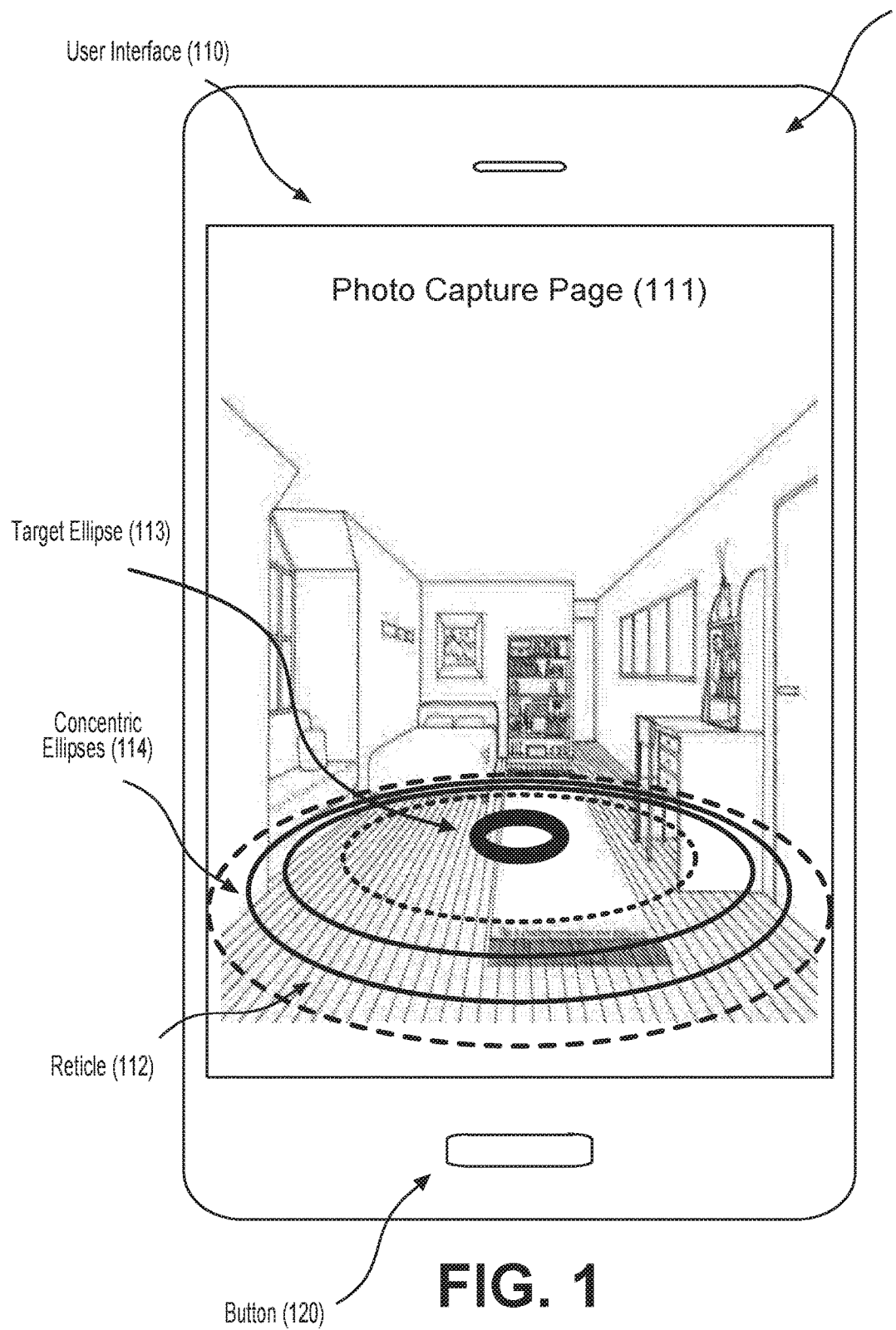
FIG. 1 shows a photo capture page of a user interface for an application according to an example embodiment.

This disclosure relates to a smart device application program which can take a photograph of an object and display specific information about the object determined by a machine learning model. Depending on the smart device's distance from the object, image data captured by the smart device can include sufficient or insufficient details for the model to be able to identify the information about the object. This application can guide the user to take an appropriately distanced photo or capture streaming image or video data from an appropriate distance. The application achieves this goal by displaying a reticle on the user interface of the smart device and this reticle can guide the user regarding the smart device's position relative to the object, e.g., it can guide the user to move closer to the object or move away from it.

In an example embodiment, the application can include a user interface. The user interface can include various pages. On one page, the user interface can display a video feed or a set of images received from the smart device's camera. The user interface can display the video feed or the set of images as the camera perceives them. The user interface can superimpose augmented reality objects (e.g., drawings or shapes) on the video feed or the set of images. The page can also enable the user to take a photo. For example, while displaying the video feed or the set of images, the page can include a button for taking a photo.

In an example embodiment, the application can detect a ground plane for the video feed (e.g. streaming image data) displayed on the user interface of the smart device. This detection can allow the application to place augmented reality objects on the ground plane. There can be various techniques for detecting the ground plane. In one technique, the application can detect a few points on a plane in the video, and if those points have the same features, that plane can be recognized as the ground plane. Specifically, using feature extraction through visual processing, the application can extract certain features in the images and use the extracted features to establish certain points which are coplanar. If the application establishes that the extracted points are coplanar, then the application can establish that the plane on which these points are located is the ground plane. The grouping of the feature points and the orientation of the phone can assist in determining the ground plane. Some of the smart device's sensors can also be involved in this process. For example, an accelerometer and a gyroscope can provide data to the application to facilitate the ground plane detection.

In another technique, the application can identify a horizontal plane in an image being captured by the smart device. The application can further determine a size of the horizontal plane, and may determine that the size of the horizontal plane satisfies a threshold value. Based on the size of the horizontal plane, the smart device can designate the horizontal plane as a ground plane and can superimpose a representation of an augmented reality object on the image relative to the horizontal plane designated as the ground plane.

In some embodiments, the user may have to establish the ground plane before pointing the smart device at an object. Specifically, in these embodiments, the user may point the smart device at the ground before pointing the smart device at the object. If the user does not point the smart device at the ground first, the user interface can display a message which asks the user to establish the ground plane.

Additional ground plane detection techniques are described in the U.S. patent application Ser. No. 15/850,234 (now U.S. Pat. No. 10,026,209), which is hereby incorporated by reference.

In an example embodiment, the application can determine a distance between the smart device (e.g. a smart phone) and a point on the ground plane. Various techniques can be used for determining the distance. For example, when a user points the phone to the ground, the application can determine a point on the ground where a hypothetical perpendicular line or plane coming out of the phone would hit the ground or intersect with the ground plane. This perpendicular line or plane may correspond to a centerpoint (or centerpoints) of the field of view of the camera or a centerpoint of image data. This point (e.g., where the ground plane intersects with the hypothetical ground plane) can be called the intersection point. The application can determine the coordinates of the intersection point as well as the smart device, and thus, the application can determine the distance between the two points. While the intersection point is defined as described above, one of ordinary skill in the art recognizes that there are many different ways to define an intersection point. For example, the stated hypothetical line, does not have to be perpendicular to the phone.

In an example embodiment, after determining the ground plane, the user can point the phone to an object (or a point under the object). The application can determine a distance between the phone and an intersection point under the object. Based on this distance, the user interface can display an augmented reality interface to notify the user how far the smart device is from the intersection point. More specifically, the user interface can display a video feed and overlay the video feed with certain augmented reality objects or indicators. For example, the user interface can display a reticle centered on the point which corresponds to the intersection point. The reticle can include a target ellipse, which surrounds the visual rendering of the intersection point, and a few concentric ellipses with the intersection point as their center. The target ellipse can include a fixed position in the page, e.g., it can always be displayed in the middle of the screen. The reticle can be displayed in a manner that it appears to be coplanar with the ground plane.

Based on a visual display of the ellipses, the user can determine whether there is enough distance between the smart device and the intersection point (i.e., whether the smart device is at an optimal scan distance from the intersection point). For example, depending on how many ellipses are displayed on the user interface, the user can determine whether the user is close enough to the object to be able to capture image data of the object that can be identified by the model.

If the user moves closer to or away from the object, the visual display of the user interface can change to notify the user that the distance between the smart device and the object has changed. For example, the video feed can show that the user is closer to the object. Also, the display of the reticle can change based on the distance between the smart device and the intersection point. For example, the reticle on the ground at the point of intersection can be redrawn. Other animation features can also be implemented. For example, a change of color, size, pulse, or animation of the reticle can be implemented to indicate a change in the distance.

FIG. 1 shows a photo capture page 111 of a user interface 110 for an application according to an example embodiment. In this embodiment, the smart device 100 can display the user interface 110. When a user visits this page, the camera of the smart device 100 can be activated and the page 111 can display a live video feed being captured by the camera. The page 111 can also display a reticle 112 including a target ellipse 113 and a set of concentric ellipses 114. In the example embodiment of FIG. 1, the user can be holding the phone in a room and pointing the phone to a carpet in the middle of the room. The point on the carpet to which the user is pointing the phone (i.e., the intersection point) can be displayed on page 111. The target ellipse 113 can surround the intersection point. The concentric ellipses 114 can indicate the distance of the smart device 100 from the intersection point on the carpet. For example, in this case, four concentric ellipses are displayed.

In this example embodiment, displaying one ellipse in the user interface can indicate that the smart device is too close to the target ellipse. Displaying two ellipses can indicate that the smart device is appropriately distanced from the target ellipse. Displaying more than two ellipses can indicate that the smart device is too far from the intersection point. The user can press the button 120 and the application can take a photo of the room. The button 120 can also be implemented as an object in the user interface 110.

Figure 2:
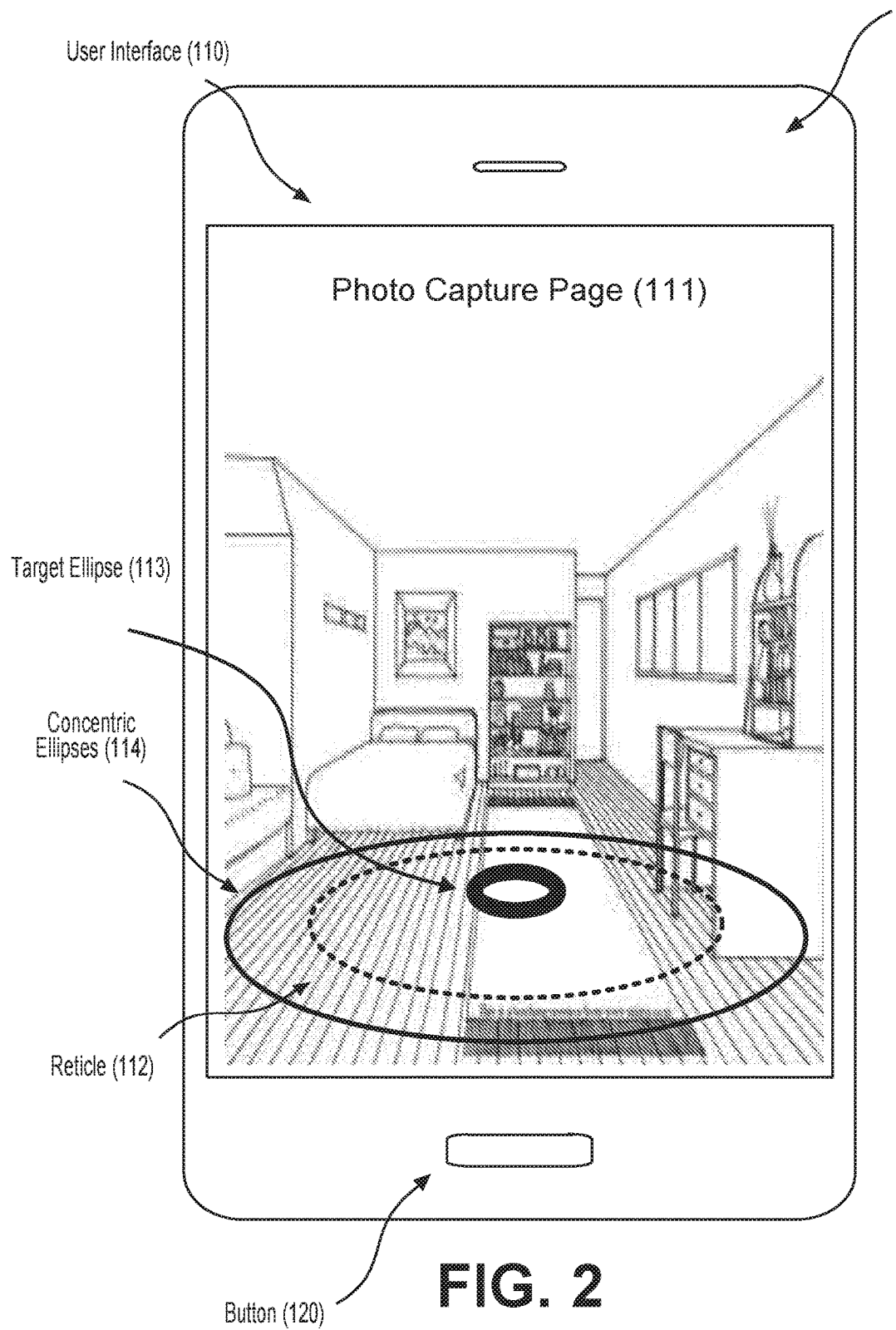
FIG. 2 shows another rendition of the photo capture page of the user interface for the application according to an example embodiment.

FIG. 2 shows another rendering of the photo capture page 111 of the user interface 110 for the application according to an example embodiment. The user interface 110 displays the reticle 112 with the target ellipse 113 and the concentric ellipses 114. In this rendering, while holding the user's smart device, the user has moved closer to the carpet, and as a result, the smart device is closer to the intersection point. Therefore, the user interface 110 displays only two concentric ellipses 114. This can indicate to the user that the user has moved close enough to the intersection point so that if a photo is taken by the application using the button 120, the model should be able to identify the object located at the intersection point.

In an example embodiment, as the user moves closer to the intersection point, the user may keep pointing the smart device at the same intersection point. For example, the user can shift the user's hand position to ensure that the visual display of the intersection point (i.e., the point on the carpet) is still maintained in the target ellipse. If the user does this, using the augmented reality indicators, the application can inform the user when the user is at an appropriate distance from the intersection point.

In an example embodiment, the user may manipulate the smart device to ensure that the intersection point is a point under the object of interest to properly indicate a distance between the smart device and the object. For example, the user can move and rotate the phone to accomplish this purpose. By doing this, if the user captures image data of an object at the intersection point, the success rate of identification of the object increases.

In this disclosure, various embodiments have been described in which the application (or user) takes a photo of an object or the application receives image data, video feed or video stream. One of ordinary skill in the art recognizes that a photo can be image data and that video feed or stream can also include image data. Moreover, a video feed or stream can include a plurality of photos (or photo frames). Additionally, a photo or image data can include a single still image capture or a captured frame of streaming image data (video feed or video stream).

Optimal Scan Distance

The optimal scan distance can be a distance or range of distances that maximizes the probability of object detection by the model. The optimal scan distance can be determined in a variety of ways. In an example embodiment, the optimal scan distance is a predetermined number that is stored in a memory of the smart device. This number can be determined based on a variety of factors. For example, it can depend on the size of an average object to be photographed, captured and/or identified by the application. As another example, this number can be determined based on the type of the smart device, the field of view of the camera of the smart device, and other factors. In some embodiments, the optimal scan distance may be determined based on a threshold percentage of a field of view being occupied by the object. As yet another example, this number can depend on the model that is being used for analyzing the image data and the resolution of the image data that is going to be submitted to the model. In some embodiments, an optimal scanning range can be learned by the model over time. In some embodiments, the optimal scanning distance for an average passenger car can be 15 to 20 ft. This distance can be determined based on empirical data. This means that although it is possible for the model to identify a specific vehicle at a distance closer or farther than 15 to 20 ft., it is less likely for the model to be able to identify the vehicle in these ranges of distances, or the model consumes greater compute power and processing time to identify the vehicle outside of an optimal range.

In another example embodiment, the optimal scanning distance can be a dynamic number which the application determines as the user is pointing the smart device at the object. For example, as the user is pointing the smart device at the object, (in the background) the application takes at least two photos or otherwise captures at least two images of the object and feeds the image data to the model. For each one of the photos or images, the model determines an identity of the object with a given probability. In one embodiment, if the identification probability for two of the photos provided to the model exceeds a detection threshold probability value, the user interface can indicate that the user is at an optimal scan distance relative to the object.

In another embodiment, if two consecutive photos taken at two different distances indicate that the later taken photo has a better probability of identification of the object by the model, the user interface can indicate that the smart device should continue moving in the direction that it moved before. On the other hand, if the later taken photo has a worse probability of identification of the object by the model, the user interface can indicate that the user should move in the opposite direction. Sensor data such as accelerometer and gyroscope can provide information to the application for determining the directions.

In an example embodiment, the optimal scan distance can be determined based on the altitude of the smart device relative to the ground. In another example embodiment, the camera parameters can be considered in determining the optimal scan distance (e.g., the field of view and the angular separation of pixels).

In an example embodiment, the application can automatically take a photo of the object if the smart device is within an optimal scan distance of the object. The application can also transmit the photo to the model for further analysis. In this example embodiment, the user does not need to manually take the photo of the object by pressing a button, e.g., the button 120. In an example embodiment, the application can include an auto-capture feature. For example, when the user has moved close enough to the intersection point, the application can automatically receive image data regarding the object and without any instructions from the user.

In another example embodiment, the application does not need an image capture by the user to identify an object displayed in the user interface of the application. For example, once the user activates a mode of the application (e.g., visits the image capture page), the application continuously analyzes the incoming image data to identify an object displayed in the image data. If the model of the application identifies the object, the application can display this information to the user. If the user is not at an optimal scan distance from the object, the application can use the reticle to guide the user to move so that the application can capture better image data. In this embodiment, the user interface can guide the user movements so that user is at an optimal scan distance from the object. This can decrease the time needed for the model to recognize the object by analyzing appropriately distanced image data at the first possible instance.

The Machine Learning Model

In an example embodiment, after the user snaps a photo or otherwise captures an image, the application can feed the image data of the photo or image into the machine learning model. In one embodiment, the application can crop parts of the photo before feeding the photo into the model. For example, the application can crop out the center portion of the image to include only the middle third of the image.

In an example embodiment, the machine learning model can be designed to identify certain types of objects. In this example embodiment, the model can be trained using many photos of objects of certain types. For example, the machine learning model can be trained to identify a year, make and model of a vehicle by training the model using photos of many different vehicles. Once a photo is provided to the model, the model can return one or more identification names and a probability value associated with that identification. For example, the model can specify that the vehicle included in the photo is a Porsche Cayenne 2018 with a probability of 80% or it is a Lamborghini Urus with a probability of 20%. The application can display the top probability vehicle to the user if the probability is above a threshold value.

In an example embodiment, after determining the identity of the object, the application can conduct an online search. For example, after determining the year, make and model of the vehicle, the application can conduct an inventory search for the same vehicle available at local dealerships. The application can also provide information relevant to the identified object to the user, e.g., the application can provide financing information to the user relating to the searched vehicles.

If the model is unable to identify the object or it identifies a vehicle with too low of a probability, the user will be presented with an error.

The machine learning model of this disclosure can be stored on the smart device. However, in some embodiments, the model can be stored on another device, and the smart device can transmit the photos to the other device for identification.

Object Recognition

In an example embodiment, prior to displaying the reticle on the user interface, the application indicates whether image quality is unsatisfactory for reasons other than proximity to the object. For example, if there is too much light or glare in the video or streaming images that the camera is capturing, the application can indicate to the user that the user needs to move or point the camera in a different direction.

As another example, the application can perform an object recognition function. If the application detects that the whole object is not displayed in the user interface or that the object is oriented in a direction which is not optimal for identification, the application can notify the user to switch the angle.

For example, an application can be implemented to capture images of vehicles and identify at least the year, make and model of a particular captured vehicle. Prior to displaying the reticle on the user interface, the application can determine whether there is a vehicle in the frame. If the application does not detect a vehicle in the frame, the application can display an error message to the user. If the application detects a vehicle in the frame, the application can determine which side of the vehicle is in the frame. In some embodiments, the model may most accurately and efficiently identify a captured vehicle based on image data of a front corner shot of the vehicle. If the application determines that the user is pointing the smart device from the side of the vehicle, the application can notify the user to move around the vehicle so that a better shot of the vehicle can be captured. Once a user moves around to a desired side of the vehicle, e.g., front corner, the application can proceed to the next step.

Example Embodiment: Car Detection and Finance Terms

Figure 3:
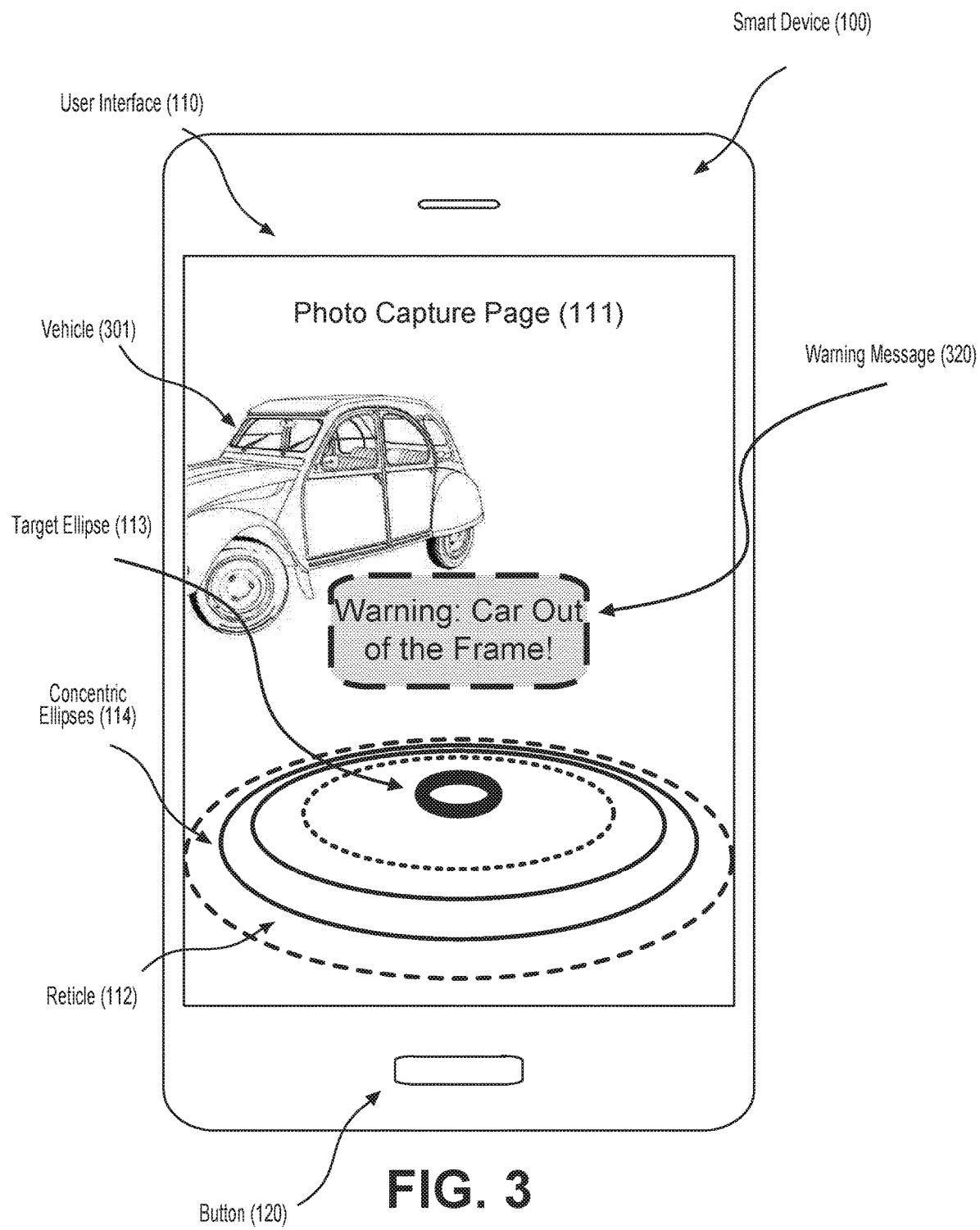
FIG. 3 shows the photo capture page for snapping a photo of a vehicle according to an example embodiment.

FIG. 3 shows the photo capture page 111 for snapping a photo of a vehicle 301 according to an example embodiment. In this example embodiment, first the user points the smart device 100 to an intersection point on the ground. The application establishes the ground plane and detects the coordinates of the intersection point on the ground. The application also determines a distance between the smart device and the intersection point. Based on the distance, the application displays a reticle 112 on the visual display of the ground plane in the user interface 110. Specifically, the application displays the target ellipse 113 around the visual representation of the intersection point.

The application then performs an object recognition routine. Specifically, the application looks for a vehicle in the video feed that is being captured by the camera of the smart device. The application can determine that only part of the vehicle 301 is displayed in the user interface 110. Hence, the application can display a warning message 320 in the user interface 110.

Figure 4:
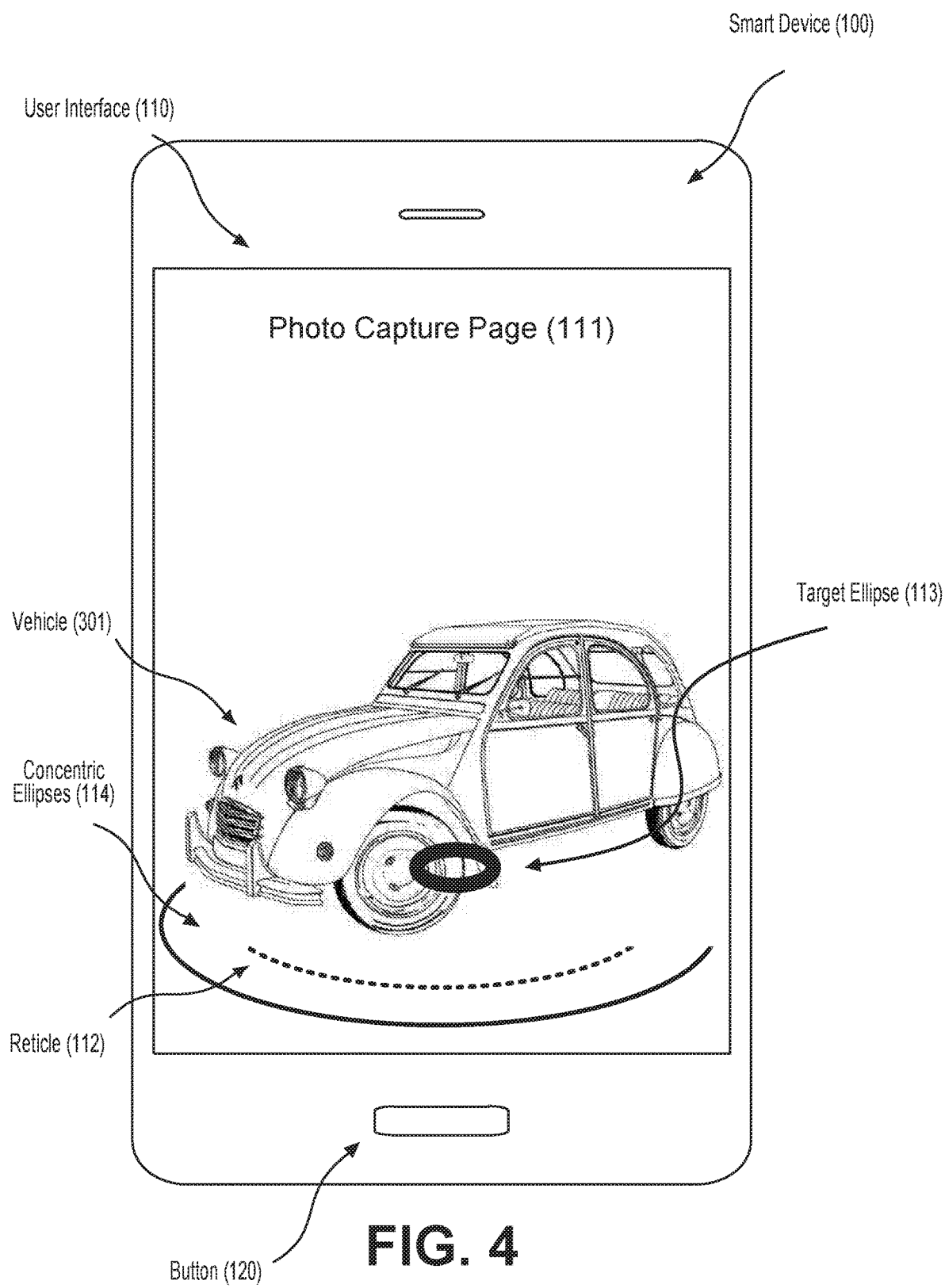
FIG. 4 shows the photo capture page after the smart device is redirected toward the vehicle according to an example embodiment.

FIG. 4 shows the photo capture page 111 after the smart device is redirected toward the vehicle according to an example embodiment. In this example embodiment, the smart device is moved closer to the vehicle and the user has directed the smart device such that the target ellipse 113 surrounds the visual representation of an intersection point which is under the vehicle. Because all of the vehicle 301 is displayed in the page 111, the application does not display the warning message 320 anymore. Additionally, the reticle 112 includes only two concentric ellipses 114. These two ellipses can indicate to the user that the user is within an optimal scan distance of the vehicle 301. In this example embodiment, the application can automatically take a photo of the vehicle 301 and submit the photo to the model when the smart device is within an optimal scan distance of the vehicle 301.

Figure 5:
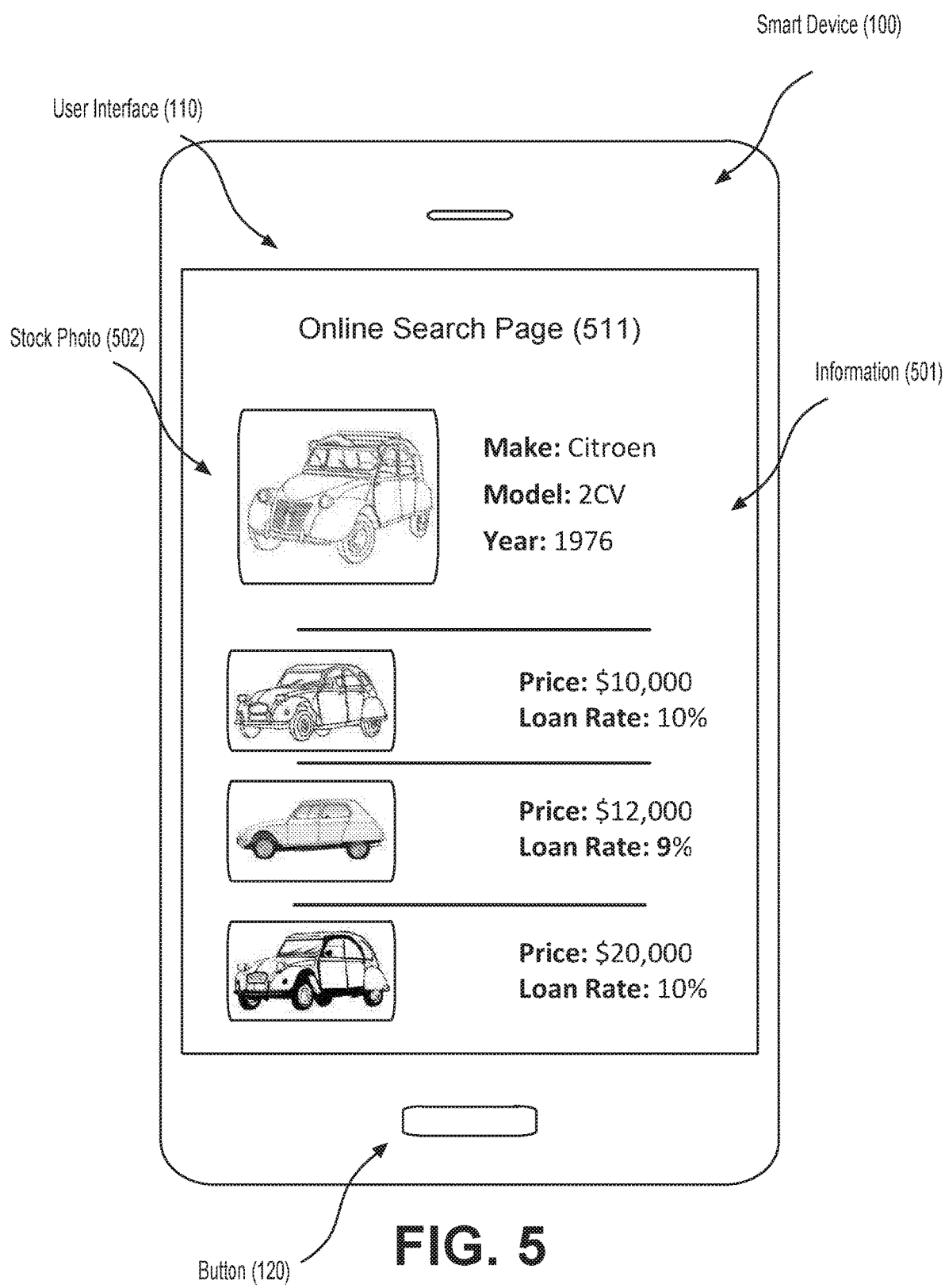
FIG. 5 shows an online search page of the user interface according to an example embodiment.

FIG. 5 shows an online search page 511 of the user interface 110 according to an example embodiment. In this example embodiment, after the photo is snapped and submitted to the model, the model can identify a vehicle depicted in the photo. For example, the model can determine with a probability of 95% that the vehicle 301 is a 1976 Citroen 2CV. On the online search page 511, the application can display information 501, e.g., 1976 Citroen 2CV, and a stock photo 502 of the vehicle 301. The application can also display a list of vehicles that the application found within a predetermined radius of the smart device 100. The application can use the GPS coordinates of the smart device for refining the online search. The application can also display the price of each vehicle and the finance terms (e.g., interest rate) for purchase of the vehicle.

In conducting the search, the application can use various information to narrow the search. For example, the application can borrow profile information from a social media application of the smart device. The social media application can provide information such as the user's age, gender, hobbies, income, etc. The application can also obtain information directly from the user. For example, the user can specific the home address of the user and the user's preferences.

Technical Implementation of the Smart Device

Figure 6:
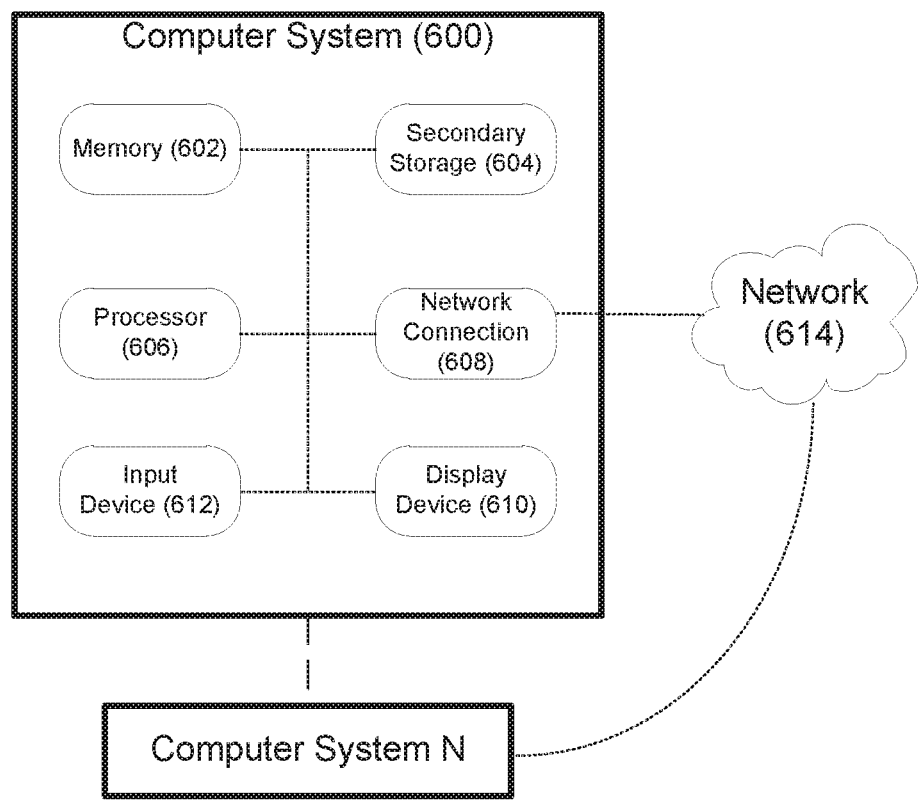
FIG. 6 illustrates exemplary hardware components for a smart device.

FIG. 6 illustrates exemplary hardware components of a smart device. A computer system 600, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquires, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
displaying a user interface on a smart device, wherein the user interface is configured to display a video feed received from an image capture element of the smart device;
detecting a ground plane in the video feed;
displaying a target over a point in the video feed, wherein the target corresponds to an intersection point where the plane at which the smart device is directed intersects with the ground plane;
determining a distance between the smart device and the intersection point;
comparing the distance with a threshold distance value, wherein the threshold distance value is calculated by determining a probability value for identification of at least one object;
displaying an indicator in the user interface, wherein the indicator reflects the comparison of the distance with the threshold distance value;
capturing image data of the at least one object;
providing the image data to a machine learning model to identify information about the at least one object in the image data; and
displaying the information about the at least one object in the user interface of the smart device.

2. The method of claim 1, wherein the intersection point corresponds to a centerpoint of a field of view of the image capture element of the smart device.

3. The method of claim 1, wherein the smart device is configured to display the indicator coplanar with the ground plane.

4. The method of claim 1, wherein the indicator is indicative of a target distance between the smart device and the at least one object.

5. The method of claim 1, wherein:
the indicator changes color based on the distance of the smart device from the intersection point,
the indicator pulses if the distance between the smart device and the intersection point is more than the threshold distance value, or
a shape of the indicator changes based on the distance of the smart device from the intersection point.

6. The method of claim 1, wherein the capturing image data of the at least one object occurs:
when the indicator indicates the distance is within the threshold distance value, or
in response to receiving a command from a user of the smart device through the user interface.

7. A device comprising:
a processor, a memory, a display and an image capture element, wherein:
the display is configured to show a user interface to display a video feed received from the image capture element of the device;
the processor is configured to detect a ground plane in the video feed;
the display is configured to show a target over a point in the video feed, wherein the target corresponds to an intersection point where the plane at which the device is directed intersects with the ground plane;
the processor is configured to determine a distance between the device and the intersection point;
the processor is configured to compare the distance with a threshold distance value, wherein the threshold distance value is calculated by determining a probability value for identification of at least one object;
the display is configured to show an indicator in the user interface, wherein the indicator reflects the comparison of the distance with the threshold distance value;
the image capture element is configured to capture image data of the at least one object;
the processor is configured to provide the image data to a machine learning model to identify information about the at least one object in the image data; and
the display is configured to show the information about the at least one object in the user interface of the device.

* * * * *